US007740468B2

(12) United States Patent
Lueneburg et al.

(10) Patent No.: US 7,740,468 B2
(45) Date of Patent: Jun. 22, 2010

(54) ROTARY PRESS

(75) Inventors: Peter Lueneburg, Berkenthin (DE); Matthias Dederichs, Hamburg (DE); Ulrich Arndt, Lauenburg (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/262,567

(22) Filed: Oct. 31, 2008

(65) Prior Publication Data

US 2009/0139417 A1 Jun. 4, 2009

(30) Foreign Application Priority Data

Nov. 30, 2007 (DE) ....................... 10 2007 057 790

(51) Int. Cl.
*B29C 43/08* (2006.01)

(52) U.S. Cl. ................... 425/193; 425/345; 425/DIG. 5

(58) Field of Classification Search ................. 425/182, 425/193, 344–345, 353, DIG. 5
See application file for complete search history.

(56) References Cited

U.S. PATENT DOCUMENTS 5,762,978 A 6/1998 Trebbi
6,972,105 B2 * 12/2005 Boeckx et al. .............. 425/345
6,997,691 B2 * 2/2006 Trebbi et al. ................ 425/345
7,360,483 B2 * 4/2008 Romer et al. ............... 425/345
7,553,436 B2 * 6/2009 Dukler et al. ............... 425/345
2004/0191347 A1 9/2004 Boeckx et al.

FOREIGN PATENT DOCUMENTS

DE 10 2004 040 163 B3 10/2008
JP 11207499 A 8/1998
WO 02074528 A1 9/2002
WO 03020499 A1 3/2003

* cited by examiner

*Primary Examiner*—Richard Crispino
*Assistant Examiner*—Thu Khanh T Nguyen
(74) *Attorney, Agent, or Firm*—Vidas, Arrett & Steinkraus, P.A.

(57) ABSTRACT

A rotary press with a stand, a rotor rotatably mounted around a vertical axis in the stand and being driven, which has an upper and a lower compression punch accommodation for upper and lower punches which co-operate with bores of a die plate of the rotor, and upper and lower control cam elements which can be detachably fastened on a cam carrier of the stand and which guide heads of the compression punches by means of control cams during the rotation of the rotor, characterized in that at least one control cam element, guiding the compression punch heads radially outside or radially inside, can be detachably fastened on the carrier and can be moved radially away from the punch heads when the fastening means is detached, so far that by-passing the punch heads, it can be taken out parallel to the axis of the rotor, towards the upside or towards the bottom side, respectively.

9 Claims, 4 Drawing Sheets

ROTARY PRESS

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention is related to a rotary press.

In a rotary press, a rotor is rotatably mounted around an upright standing axis in a stand and driven. The rotor body, mostly made up of one piece, contains an upper and a lower punch accommodation for upper and lower punches, which are guided axis parallel in bores. The compression punches co-operate with bores of a die plate, which is either formed in one part with the rotor body or represents a separate part. From DE 10 2004 040 163, the entire contents of which is incorporated herein by reference, it has also become known to compose the die plate from individual segments.

During the rotation of the rotor, the compression punches are moved axially. A great part of the movements is effected by control cams. For this purpose, control cam elements are attached on cam holders in the stand, which co-operate with the upper side and/or the bottom side of the head of the compression punches. Only in the region of compression stations with upper and lower compression roller, the compression punches are not guided by control cams.

For reasons of wear or a change of the specification, it is necessary to dismount the control cam elements and to replace them by other ones. For this purpose, it is necessary in the state of the art to remove machine shell parts and the filling device from the press stand, and to dismount plural punches or the die bore with the compression punches. In addition, powder existing in the machine must be sucked off. The mounting expenditure is therefore considerable. In addition, the operation of the rotary press is interrupted during the mounting time, of course. Thus, the exchange of control cam elements leads to a considerable interruption of the production time.

The present invention is based on the objective to provide a rotary press in which control cam elements can be dismounted without having to remove the compression punches before.

BRIEF SUMMARY OF THE INVENTION

In the present invention, at least one control cam element is provided, guiding the compression punch heads radially outside and/or radially inside in the running direction of the compression punches. According to the present invention, the control cam element is detachably fastened on the cam carrier and it can be moved radially away from the punch heads when it is detached, in fact so far that it can be taken out parallel to the rotor axis, by-passing the punch heads, towards the upside or towards the bottom side. It goes without saying that the control cam element can be moved radially away from the punch heads only from that side at which it bears against the compression punches.

However, when control cam portions striking oppositely on the punch heads are provided, these control cam portions are each one assigned to an own control cam part. Both control cam parts are detachably fastened on the cam carrier. Each one of both control cam parts has a control cam portion, which strikes against the heads of the compression punches on opposing sides. The arrangement of the control cam parts relative to the cam carrier is such that that after detaching them from the cam carrier, the control cam parts are movable radially apart from each other at first, and subsequently they can be moved parallel to the axis of the rotor.

In this case, the control cam element is divided into two parts in the invention, and the individual parts can be removed separately, without that the compression punches have to be taken out before for this purpose. Therefore, the compression punches can remain in the press. The change of the control cam elements can take place rapidly in the invention, through which smaller standstill times are required in a remodeling.

The present invention is particularly advantageous when rotary presses are used in which it is intended to let the rotor and the compression punches remain in the press even for cleaning purposes. This is possible when the rotor is surrounded by a sealing casing, which forms a relatively small compression space inside of the press casing. The casing is realised such that the upper and lower ends of the compression punches projecting out from the rotor, which co-operate with the control cams, are situated outside the compression space. The compression punches on their part are sealingly guided in the bores of the punch accommodations.

In one embodiment of the present invention, the control cam parts have radial flange portions, wherein the flange portion of the radially outer control cam part overlaps the flange portion of the radially inner control cam part. In a further embodiment it is provided that the flange portions are prestressed against each other when they are fastened on the cam carrier by means of screws.

Different ways of mounting the control cam parts on the cam carrier are conceivable. According to one embodiment of the present invention, one of them consists in that the radially inner control cam part is fastened on the cam carrier, and the radially outer control cam part is fastened on the radially inner control cam part. Alternatively it can be provided according to another embodiment of the present invention that the inner control cam part has a flange portion pointing radially towards the outside, which overlaps the outer control cam part.

BRIEF DESCRIPTION OF THE SEVERAL VIEWS OF THE DRAWINGS

Examples of the realisation of the present invention are explained in more detail in the following by means of drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 2:
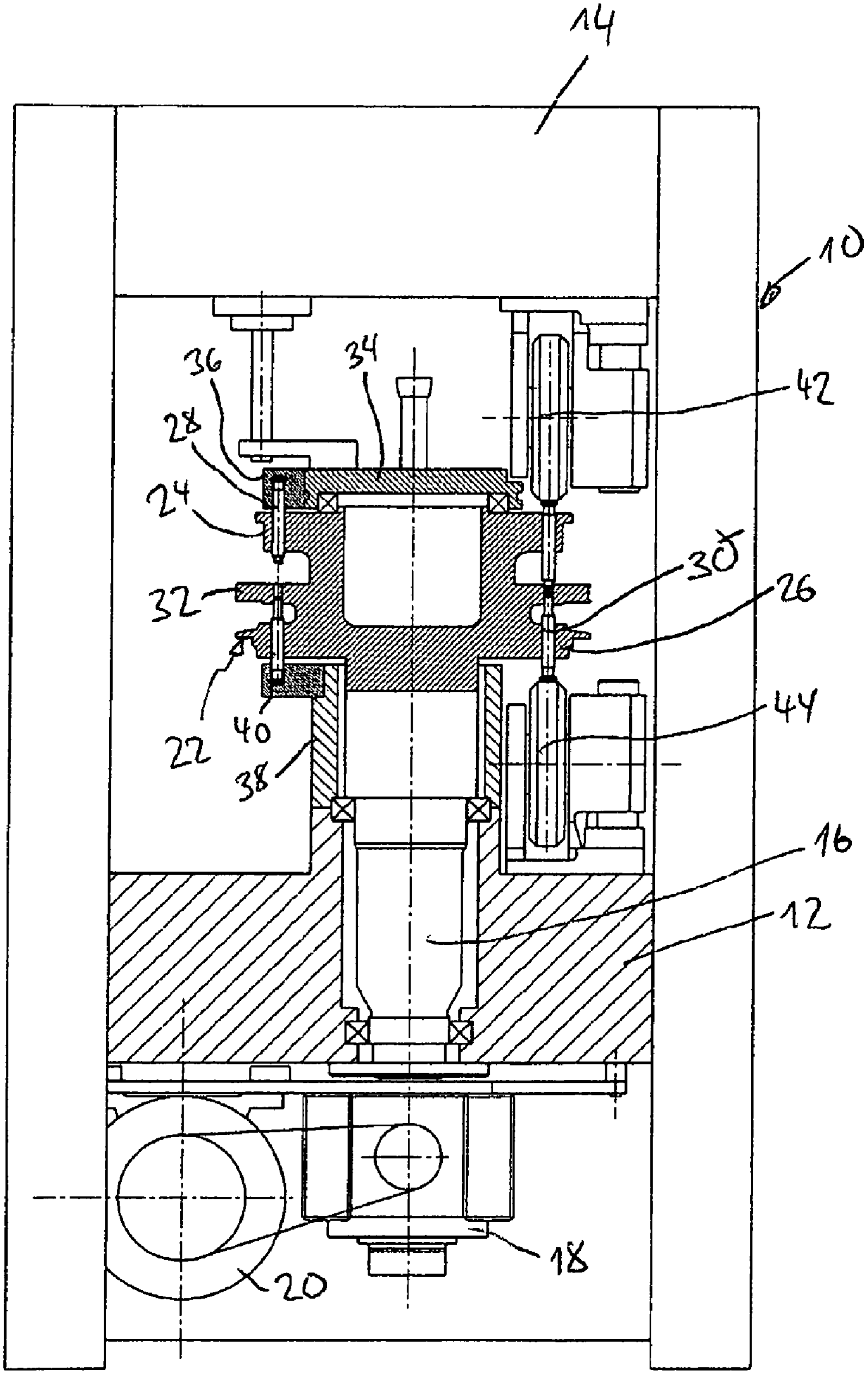
FIG. 2 shows the schematic design of a rotary press with guide cam elements according to the state of the art.

A stand 10 of a rotary press after FIG. 2 has a lower platform 12 and an upper platform 14. The lower platform 12 bears a drive shaft, which is driven by an electric motor 20 via a gearbox 18. A rotor 22 sits on the shaft 16, which has an upper punch accommodation 24 and a lower punch accommodation 26 for upper punches 28 and lower punches 30. The compression punches 28, 30 co-operate with bores of a die plate 32, which is formed in one piece with the rotor 22 in the shown case.

In FIG. 2, an upper cam carrier 34 holds a control cam element 36. A lower cam carrier 38 holds a lower control cam element 40. In the region of a compression station, an upper compression roller 42 and a lower compression roller 44 act on the heads of the compression punches 28, 30. In the region of the compression rollers, the compression punches 28, 30 are pressed into the die bores in order to compress the powder-shaped material in the bores, which had been charged into the bores by a not shown filling apparatus before. The shown rotary press after FIG. 2 corresponds to the state of the art.

Figure 1:
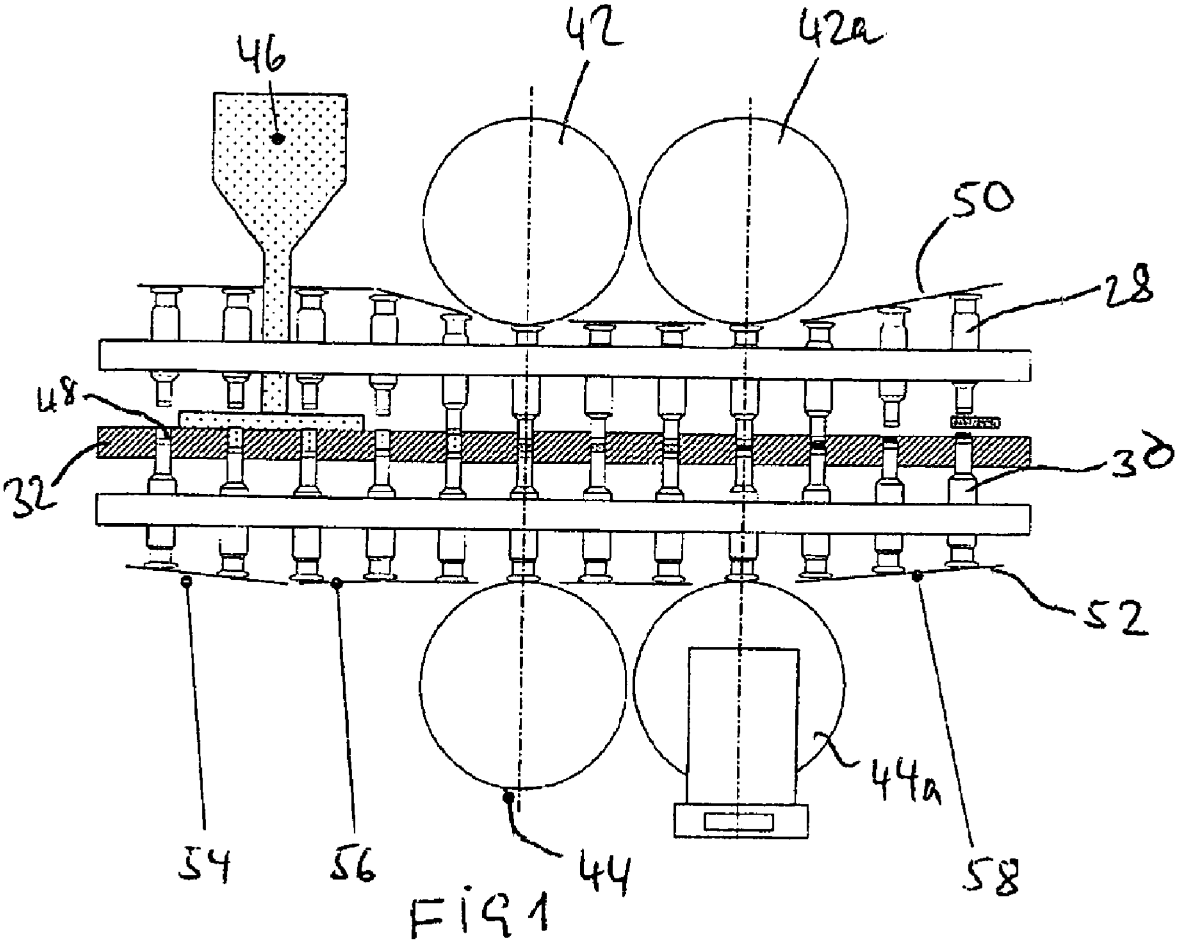
FIG. 1 shows the developed view of a rotor of a rotary tablet press according to FIG. 2 in a schematic representation.

In FIG. 1, a developed view of the rotor is shown. Equal parts are provided with the same reference signs. At 46, a filling apparatus is shown, which fills die bores 48 of the die plate 32 with powder-shaped material. One recognises that outside of the compression rollers 42, 44 or 42*a*, 44*a*, respectively, the heads of the compression punches 28, 30 are guided with the aid of upper control cam elements 50 and lower control cam elements 52. The filling takes place in the region 54. A dosage of the compression material takes place in the region 56, wherein the position of the lower punches 30 presets the filling volume. A pre-compression takes place by the compression rollers 42, 44. The main compression takes place by the compression rollers 42*a*, 44*a*. The pressed articles are ejected by the lower punches 30 in the region 58.

Figure 3:
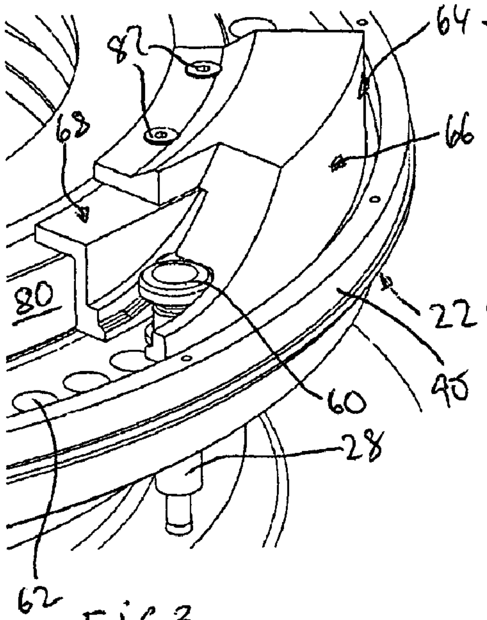
FIG. 3 shows a part of a rotor with a control cam element according to the present invention in a perspective view.
Figure 4:
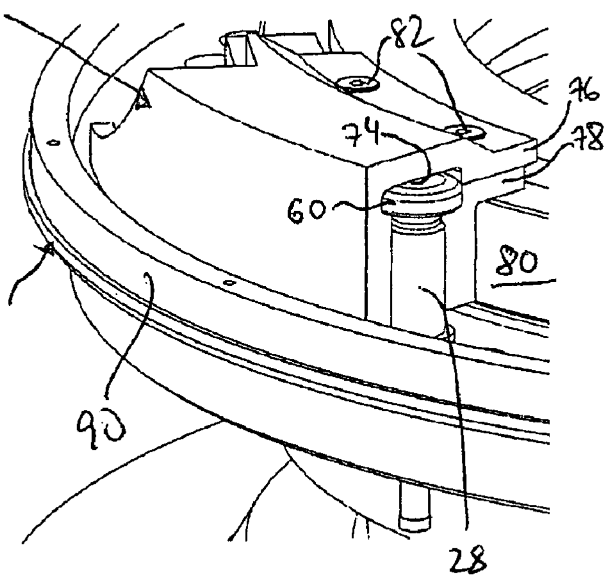
FIG. 4 shows a similar depiction like FIG. 3, but from the opposite side of the control cam element.

In FIGS. 3 and 4, the rotor 22 according to FIG. 2 is indicated in a perspective view. An upper punch with a head 60 is recognised at 28. In addition, one recognises bores 62 in FIG. 3, which guide upper punches 28. In FIGS. 3 and 4, a control cam element 64 is shown in addition, which is composed of a radially outer control cam part 66 and a radially inner control cam part 68. Each control cam part 66, 68 has a control cam portion 70 or 72, respectively. In the assembled state, as shown in FIGS. 3 and 4, the control cam portions 70, 72 form a control cam in the shown region on the perimeter of the rotor 22.

Figure 8:
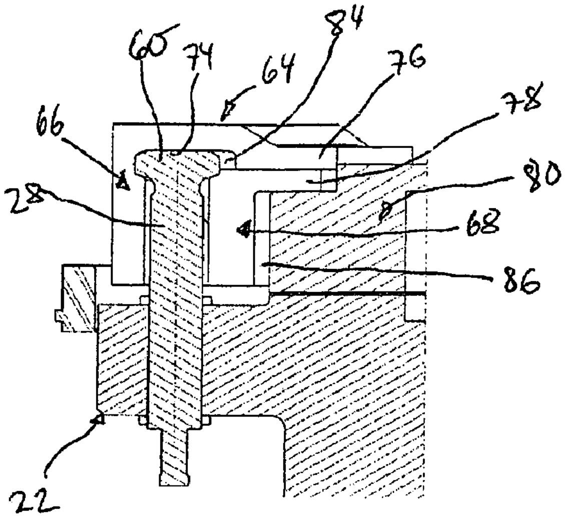
FIG. 8 shows a cross section through the depiction after FIG. 4.

The co-operation of the control cam parts 66, 68 can be recognised in FIG. 8. Control cam portions 70, 72 grasp below the punch head 60, wherein a further control cam portion 74 co-operates with the upper side of the punch head 60. The outer control part 66 has a flange 76 radially pointing towards the inside. The inner control part 68 has a flange 78 radially pointing towards the inside. The latter lies on a planar surface of a cam carrier 80, and the flange 76 bears on an assigned higher surface of the cam carrier 80. The two flanges 76, 78 are fastened on the cam carrier 80 with the aid of screws, as the same can be seen at 82 in FIGS. 3 and 4. One recognises from FIG. 8, that the recess in the control cam part 66, which receives the head 60 of the punch 28, is broader than would be necessary for the guiding. Thus, a free space 84 is created. One recognises further that a gap 86 remains between the cam carrier 80 and the control part 68.

Figure 9:
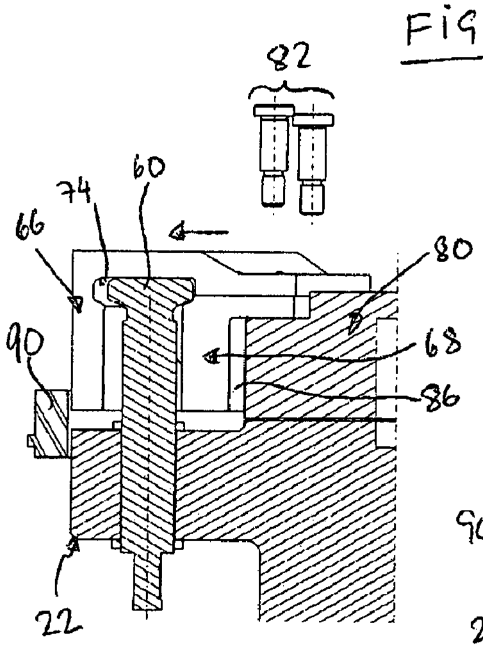
FIG. 9-12 show the steps for dismounting the control cam parts of the control cam element according to FIG. 8.
Figure 10:
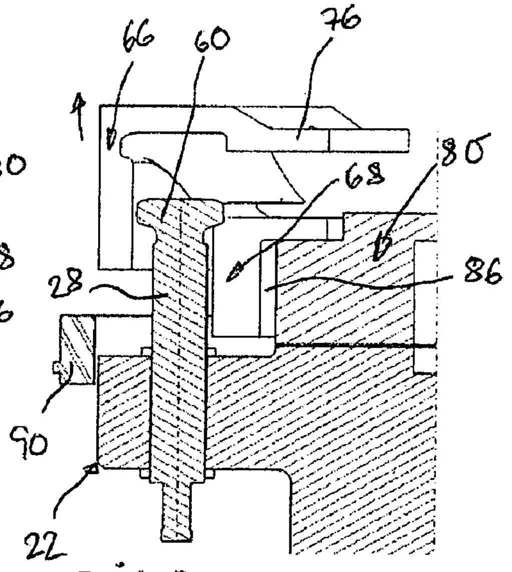
Figure 11:
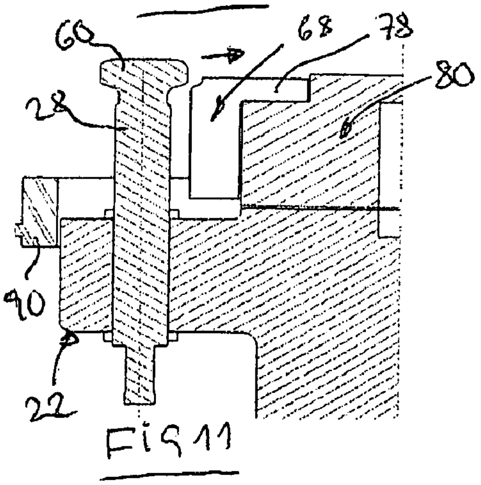
Figure 12:
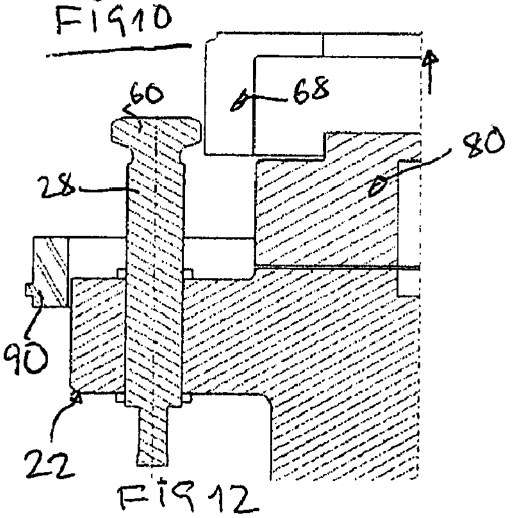

When the screws are removed, as is shown in FIG. 9, the outer control cam part 66 can be radially moved towards the outside, until it bears against an edge 90 of the rotor 22. In this, the punch head 60 moves into the free space 84 and hits the facing side of the recess of the control part 66. As results from FIG. 10, the control part 66 can now be moved upward and be released from the punch head 60. In FIG. 11 it is shown how the control cam part 68 can be subsequently radially shifted towards the inside and thus can do away with the free space 86. In this, the control cam part 68 bears against the cam carrier 80. As can then be seen from FIG. 12, even the inner control part 68 can be removed towards the upside.

One recognises that the control cam element 64 can be removed completely without having to disassemble the compression punches 28. Anyway, disassembly of the compression punches is possible, of course, like when another specification is to be used for instance.

Figure 5:
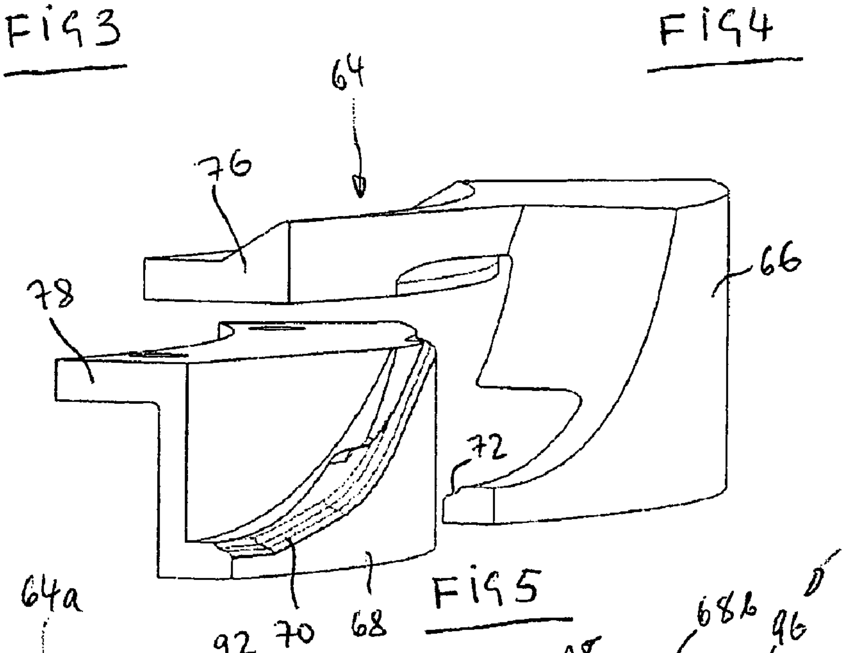
FIG. 5 shows the dismounted control cam parts of the control cam element according to FIGS. 3 and 4.
Figure 6:
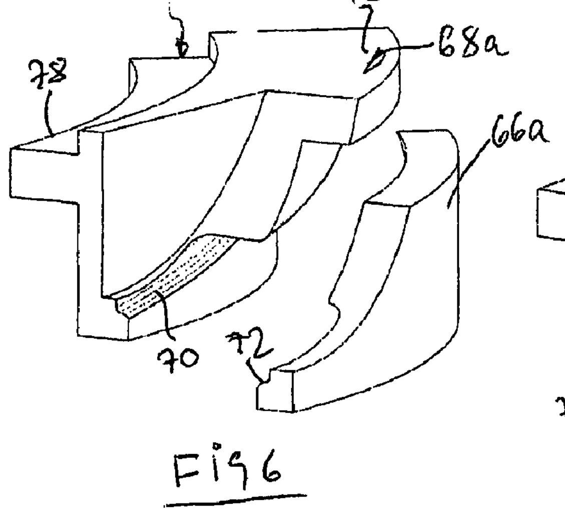
FIG. 6 shows a second embodiment of a control cam element.
Figure 7:
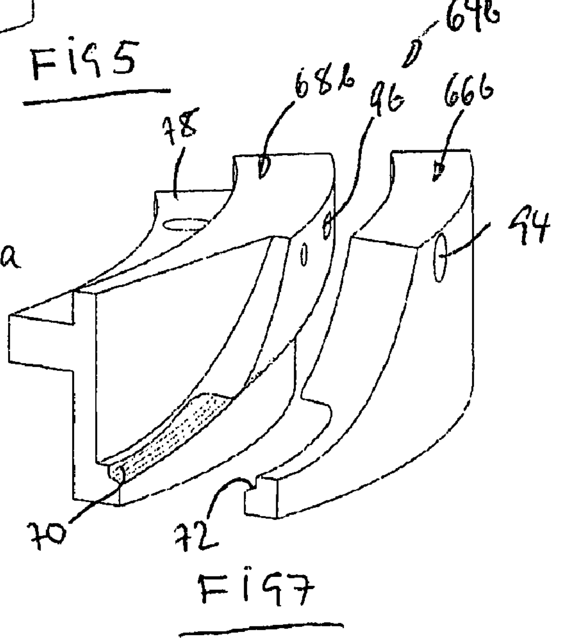
FIG. 7 shows a third embodiment of a control cam element.

The control cam element 64 depicted in FIGS. 3 and 4 and 8 to 12 is shown in an exploded view in FIG. 5. FIGS. 6 and 7 show other constructional realisations. The embodiment after FIG. 6 features an inner control part 68*a* and an outer control part 66*a*. The control cam portions 70, 72 are similar to those after FIG. 5. While both control parts 66, 68 are fastened on the cam carrier 80 via flanges 76, 78 in FIG. 5, the outer control part 66*a* is fastened on the inner control part 68*a* in the embodiment after FIG. 6. A flange 92 of the inner control part 68*a*, radially pointing towards the outside, overlaps the upper side of the outer control part 66*a* in this.

In the embodiment after FIG. 7, the outer control part 66*b* is similar to a large extent to the control part 66*a* after FIG. 6. One recognises also a bore 94 for the screwing with the inner control part 68*b*, which has also bores 96. In the shown case, the upper sides of the control parts 68*b*, 66*b* are aligned with each other. The inner control part 68*b* is in turn fastened on the cam carrier 80, not shown in these figures, with the aid of the flange 78 according to FIGS. 8 to 12.

What is claimed is:

1. A rotary press comprising: a stand, a rotor rotatably mounted around a vertical axis in the stand, the rotary press having an upper and a lower compression punch accommodation for upper and lower punches having heads, the upper and lower punches cooperating with bores of a die plate of the rotor, and upper and lower control cam elements which are detachably fastened to a cam carrier of the stand, the control cam elements guide upper and lower punches during rotation of the rotor, at least one control cam element having cam portions on opposing sides of the heads of the punches, the cam portions being formed by one radial inner and one radial outer control cam element part, the control cam element parts being releasably attached to the cam carrier, the control cam element parts being constructed and arranged for radially movement away from the heads of the punches wherein the cam carrier is located radially inwardly of the control cam elements, and wherein the control cam elements parts are attached to the cam carrier and constructed and arranged that after the radial movement of the control cam elements parts the control cam element parts can be removed parallel to the axes of the rotor along the heads of the punches upwardly or downwardly, respectively.

2. A rotary press according to claim 1, wherein the control cam portions are formed by one control cam part situated radially inside and one control cam part situated radially outside of the compression punch heads, wherein the control cam parts can be detachably fastened on the cam carrier, and wherein each control cam part can be moved radially away from the compression punch heads following detachment of a fastener, and subsequently moved parallel to the axis of the rotor, towards the upside or towards the bottom side, respectively.

3. A rotary press according to claim 1, wherein the control cam elements or the control cam parts, respectively, have radial flange portions, which bear on a radially planar surface of a cam carrier, wherein the radial planar surface has a guide for the radial movement of the control cam element or the control cam part, respectively.

4. A rotary press according to claim 3, wherein a flange portion of the radially outer control cam part overlaps a flange portion of the radially inner control cam part.

5. A rotary press according to claim 4, wherein the flange portions are prestressed against each other and fastened on the cam carrier by screws.

6. A rotary press according to claim 2, wherein the radially inner control cam part is fastened on the cam carrier, and the radially outer control cam part is fastened on the radially inner control cam part.

7. A rotary press according to claim 6, wherein the inner control cam part has a flange portion pointing radially outwardly, the flange portion overlapping the outer control cam part.

8. A rotary press according to claim 2, wherein the control cam portions engage a bottom side of the punch heads, and the control cam portion of the outer control cam part engages an upper side of the punch heads, wherein the outer control cam part is movable radially towards the outside.

9. A rotary press according to claim 2, further comprising flange portions on the control cam parts, said flange portions bearing on radially planar surface portions of the cam carrier.

* * * * *